Oct. 17, 1967     B. H. SEIBEL     3,347,130

OPTICAL MEASURING INSTRUMENTS

Filed May 2, 1962     4 Sheets-Sheet 1

INVENTOR.
BOBLY H. SEIBEL

BY

*Reynolds & Christensen*

ATTORNEYS

Oct. 17, 1967     B. H. SEIBEL     3,347,130
OPTICAL MEASURING INSTRUMENTS
Filed May 2, 1962     4 Sheets-Sheet 2
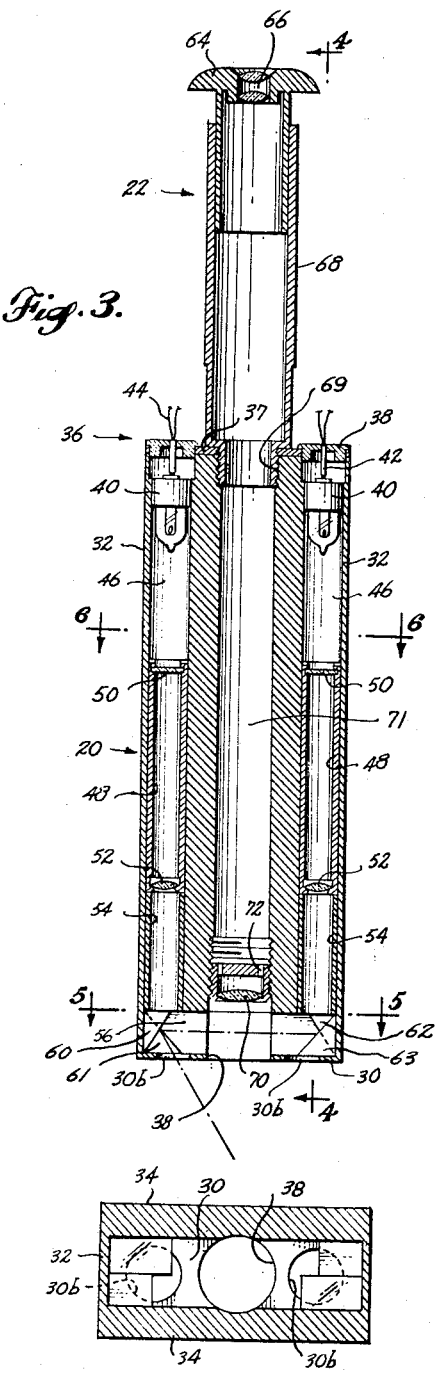
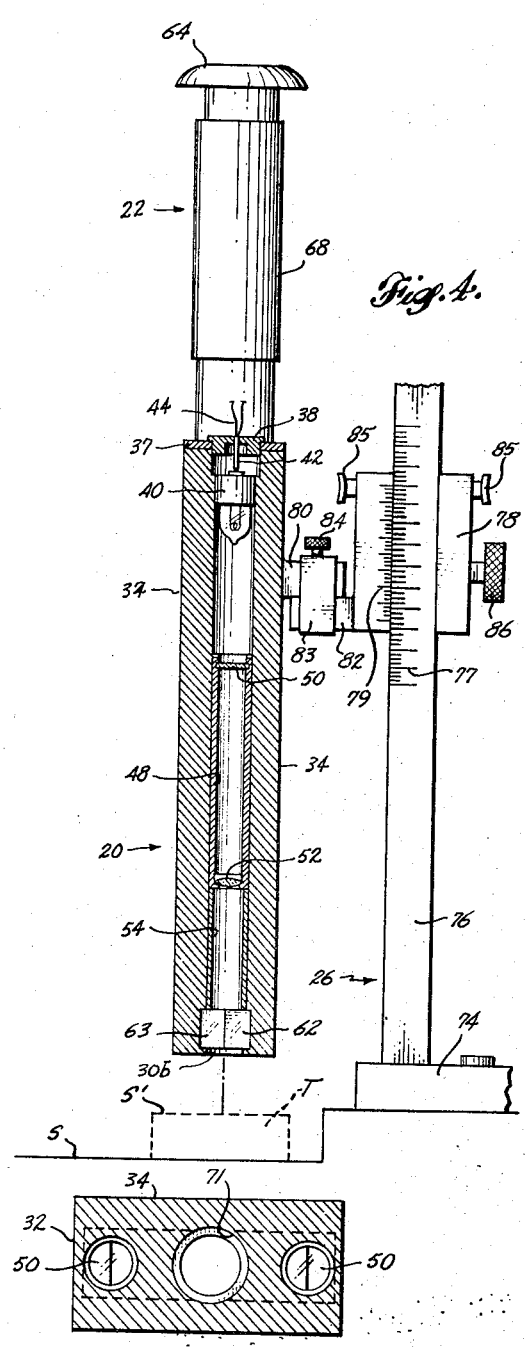
INVENTOR.
BOBLY H. SEIBEL
BY
Reynolds & Christensen
ATTORNEYS Oct. 17, 1967  B. H. SEIBEL  3,347,130
OPTICAL MEASURING INSTRUMENTS
Filed May 2, 1962  4 Sheets-Sheet 3
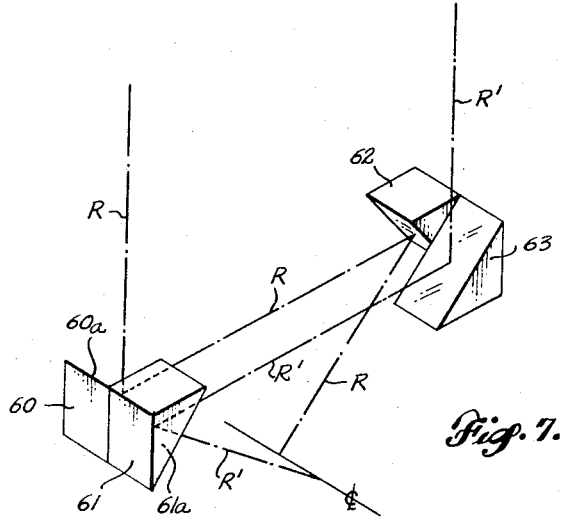
Fig. 7.
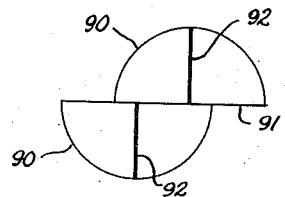
Fig. 8.
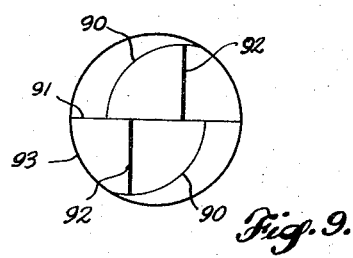
Fig. 9.
Fig. 10.
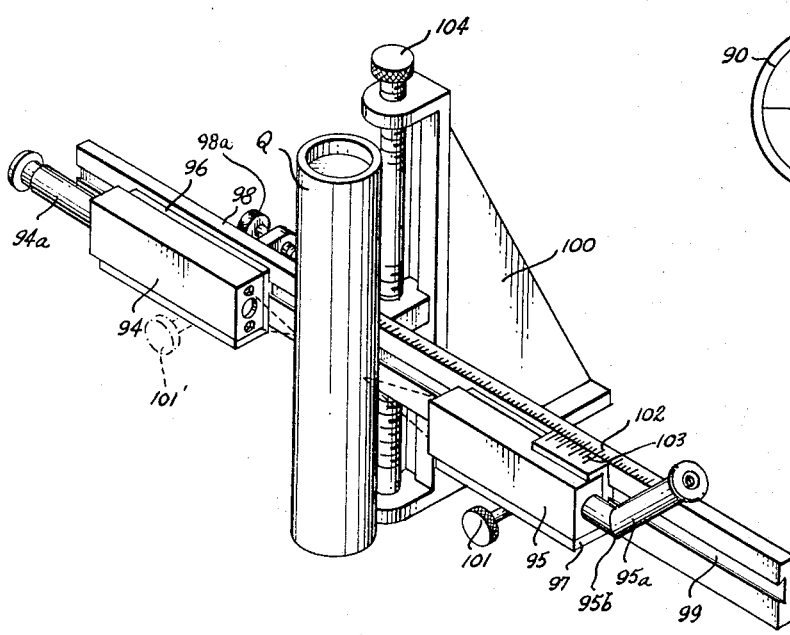
Fig. 11.
INVENTOR.
BOBLY H. SEIBEL
BY
Reynolds & Christensen
ATTORNEYS

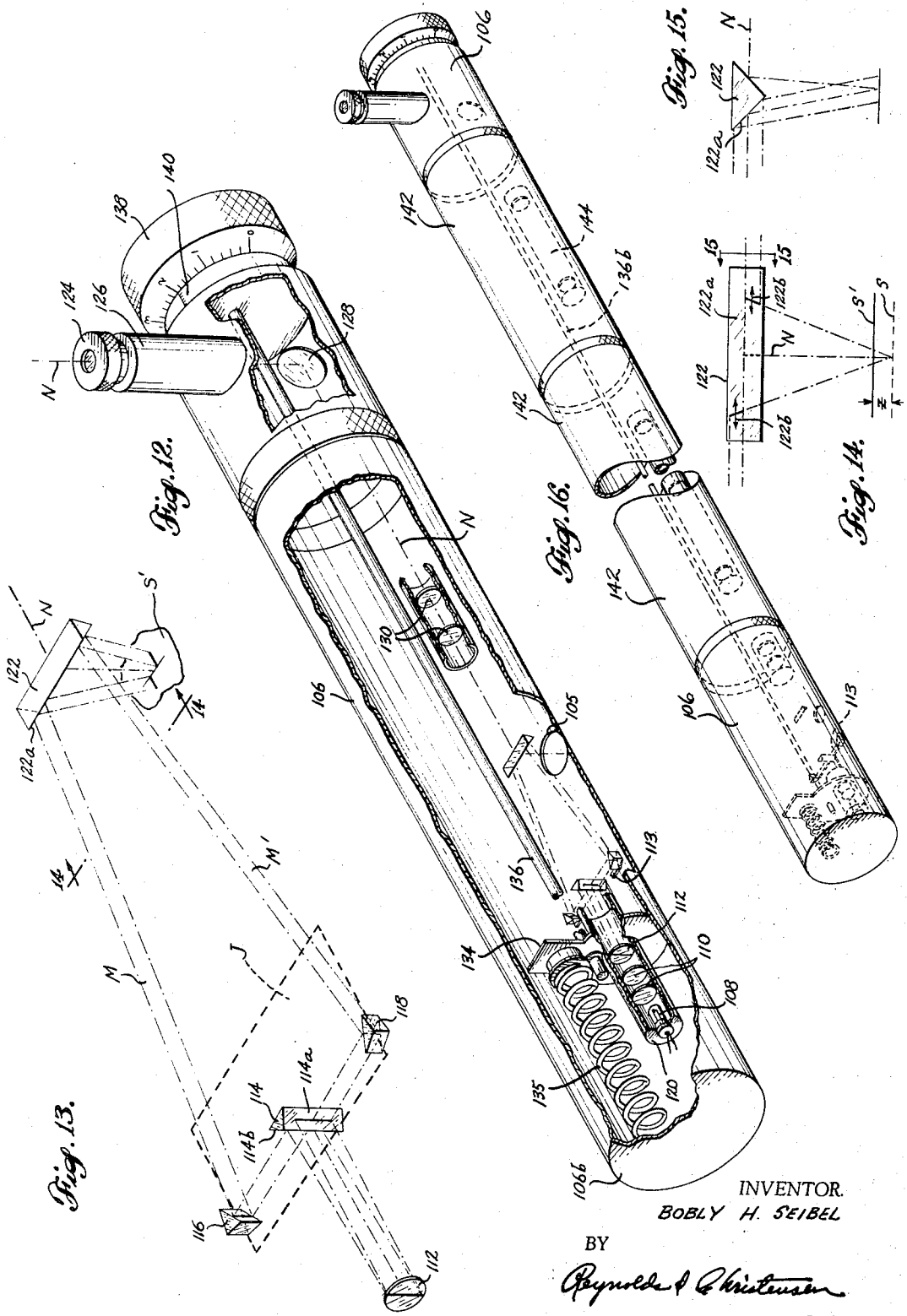

3,347,130
OPTICAL MEASURING INSTRUMENTS
Bobly H. Seibel, Seattle, Wash., assignor to The Boeing Company, Seattle, Wash., a corporation of Delaware
Filed May 2, 1962, Ser. No. 192,305
8 Claims. (Cl. 88—14)

This invention relates to improved techniques in optical measurement, and more particularly to a method and instruments for accurate optical measurement of heights, thicknesses, surface irregularities or deviations from predetermined surface contour, and distances. While the invention is herein illustratively described in terms of certain presently preferred forms thereof, it will be recognized by those skilled in the art that various changes and modifications in structural detail may be made without departing from the scope of the invention.

In certain types of construction it has become common practice to use optical instruments for dimensional inspection, positioning and alignment of parts, and other uses requiring varying degrees of accuracy. For example, in the construction of aircraft, radar apparatus, and the like, increasing need has been apparent for more rapid and closer inspection of parts for dimensional control and other purposes. Optical instruments are found to present satisfactory solutions to some of the problems involved, but allowed tolerances impose exacting requirements of accuracy and reliability. Compactness and simplicity of construction are desirable, and yet fairly powerful instruments are required. In addition, instruments are needed which will measure within close tolerances without necessity for marking or otherwise directly contacting the surfaces to be measured or checked.

Optical instruments are also needed for making measurements in inaccessible places such as inside cylinders, tubing, and the like, where the depth of pits, depressions or grooves must be determined and where the use of conventional mechanical measuring instruments is impossible or impractical and would give less accurate results.

It is therefore a principal object of this invention to meet the above requirements by providing improved instruments combining principles of light projection and optics to achieve greater accuracy and ease of operation than heretofore attained.

It is a related object hereof to provide optical instruments which themselves create an image on a viewing surface to be observed for measurement, thereby eliminating necessity for reliance upon ambient light conditions or upon the appearance of different observation lines or images marked on or characteristic of the surface itself.

A further related object is to provide optical measuring instruments and techniques in which the necessity for marking on measuring surfaces is eliminated, indeed in which no physical contact with the body or surface to be measured is necessary, other than for positioning the instrument operatively in relation thereto.

Another object hereof is to provide such instruments in which errors due to color dispersion are eliminated.

Another object is to provide such instruments in which parallax errors are nonexistent.

Still another object is to provide optical instruments in which readings may be repeated with greater ease and accuracy.

A more particular object of this invention is to provide instruments incorporating the above advantages which are compact in arrangement and simple in construction and therefore inexpensive to produce. In accordance with this invention instruments of very high accuracy and resolution are possible at relatively low cost.

Another particular object of this invention is to provide instruments incorporating the above advantages for visual inspection and measurement of depth and thicknesses in otherwise inaccessible places. For example, certain instruments constructed according to this invention are adapted to measure the depth of pits, scratches and grooves on the inside surfaces of tubes, cylinders and the like where mechanical measuring instruments cannot be used.

Another particular object of this invention is to provide optical calipering apparatus incorporating the above advantages for measuring the thickness of a body or the distance between two parallel planes while eliminating necessity for direct contact with the body by the instrument, as is necessary with mechanical instruments used to achieve the same purposes.

According to this invention two images are projected onto an imaging surface along separate light paths lying substantially contiguous to a common incidence plane (i.e., a single plane containing the angle of incidence for such light path) and converging mutually in that plane toward the surface. Each image is preferably an image of a single line, the lines extending oppositely away from the plane and preferably lying parallel to each other as projected onto the surface. Imaging surfaces are viewed through an optical system. A reference position is established by location of the instrument with reference to an imaging surface in a first viewing plane of known position or to some other structural reference. The images are then brought into alignment (end-to-end coincidence) on an imaging surface in a second viewing plane by manipulation of instrument mechanism operable to change the relative positions of the images on a surface. The amount of operating shift in the instrument mechanism is a measure of the distance between the viewing planes or imaging surfaces, or from a reference location to such a surface, and is read directly on a calibrated scale, or otherwise utilized.

There are various possible ways of performing these basic steps and various forms of apparatus may be provided combining the necessary elements. In one embodiment, for example, operating mechanism is provided to effect relative movement between the imaging surface and the instrument means for projecting the line images, thereby effecting relative movement of the line images. In this embodiment, adapted to measure short distances very accurately, the optical system is a microscope mounted for conjoint movement with novel means for projecting the line images so that focus of the microscope is maintained in the viewing plane of image alignment throughout relative movement of the system with respect to the surface. The novel projecting means are adapted to prevent color dispersion and image distortion which would reduce accuracy of the system.

In another embodiment of the invention more than one such optical gauging system is provided to form what may be called an optical caliper. Preferably two such systems are supported in predetermined spaced relation to accommodate a body therebetween whose thickness is to be measured. The two systems are positionally referenced to each other and adjustment means are provided to effect relative movement therebetween. A common measuring means is provided which is calibrated to indicate directly the distance between the respective image alignment viewing planes of the two systems.

A third embodiment of the invention differs from those previously described in the means for effecting relative movement of the line images on the imaging surface. Instead of movement of the projecting means transversely to the viewing plane or imaging surface, novel means are provided wherein by relative movement of different parts of the projecting means relative movement of the line images is achieved. More particularly, an image reflecting element is disposed optically between the image projecting means and the imaging surface, and relative movement between the reflecting element and the projecting means is effected to achieve relative line image movement. In the preferred form of this embodiment the same image reflecting element functions also to direct the view of the optical system to the imaging surface area. The particular configuration of this embodiment permits constructing the same with a very small cross section so that it may be adapted for inspection and measurement in otherwise inaccessible places, such as within tubes and cylinders, etc.

These and other features, objects and advantages of the invention will become more apparent from the following more detailed description thereof with reference to the drawings which illustrate preferred embodiments thereof.

FIGURE 3 is a longitudinal sectional view of an optical height probe constructed according to this invention, showing details of the microscope and projection means.

FIGURE 4 is a sectional view taken on line 4—4 of FIGURE 3 and showing the instrument of FIGURE 3 mounted on a standard height gauge.

FIGURE 5 is a transverse sectional view taken on line 5—5 of FIGURE 3.

FIGURE 6 is a transverse sectional view taken on line 6—6 of FIGURE 3.

FIGURE 7 is a perspective view of the arrangement of projecting elements in the apparatus of FIGURE 3.

FIGURE 8 is an enlarged plan view of the images as projected onto a surface by the apparatus of FIGURE 3 with the images shown in nonalignment and as seen by the naked eye.

FIGURE 9 is a plan view of the nonaligned images shown in FIGURE 8 as seen through the ocular of the microscope in the apparatus of FIGURE 3.

FIGURE 10 is a view through the ocular of the microscope of FIGURE 3 with the line images shown in alignment.

FIGURE 11 is a perspective view of an optical calipering apparatus embodying principles of the invention.

FIGURE 12 is a perspective view of a tubular internal measurement probe devised according to the invention with part of the structure cut away to reveal internal structural details.

FIGURE 13 is a perspective view of the arrangement of elements in the projection system of the apparatus shown in FIGURE 12.

FIGURE 14 is a view taken on line 14—14 of FIGURE 13.

FIGURE 15 is an end view taken on line 15—15 of FIGURE 14.

FIGURE 16 is a perspective view showing the addition of lengthening sections, each including optical trains, to the apparatus of FIGURE 12 and which permit use of the instrument for internal measurements requiring greater reach from the location of the observer's eye.

Figure 1:
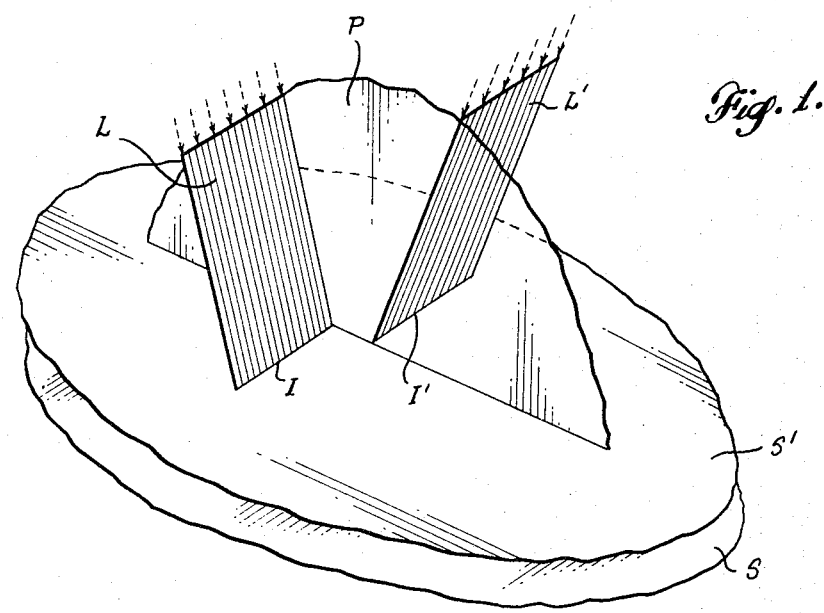
FIGURE 1 is a diagrammatic perspective view of the method of forming line images on a given imaging surface area.
Figure 2:
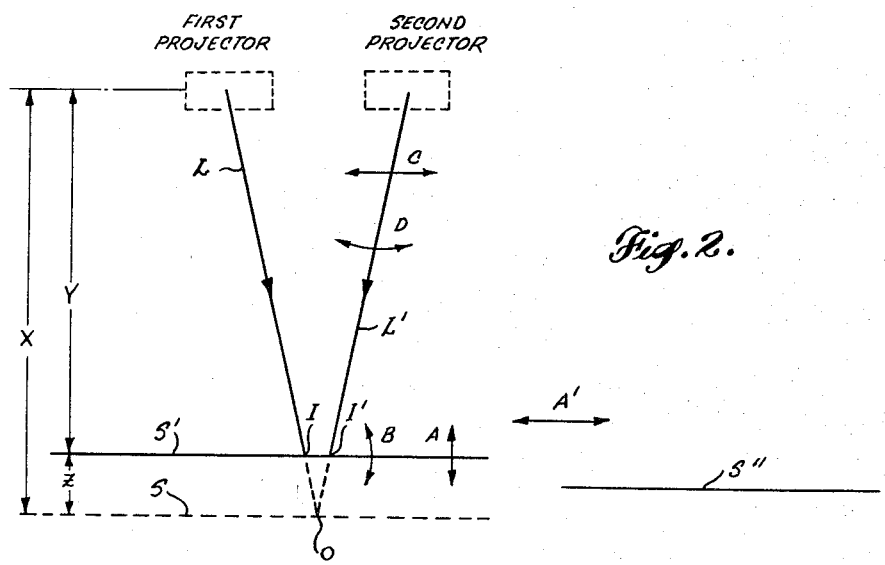
FIGURE 2 is a diagram indicating different methods for achieving relative movement of the line images on the imaging surface.

The basic technique is illustrated in FIGURES 1 and 2. Images I and I' are projected by first and second projectors onto any of different imaging surfaces, S or S' for example, lying in different viewing planes (i.e., planes in which the optical viewing system of the invention is focused for viewing alignment or nonalignment of projected images). As disclosed herein, the images are parallel straight lines projected along light paths L and L' respectively, which appear in FIGURE 1 to form converging sheets or planes of light each having one edge lying contiguous to a common incidence plane P (containing the angle of incidence for each light path) and converging with respect to each other at an acute angle in that plane. The imaging surface area upon which the images fall is viewed through a magnifying optical system. In using the instrument, adjustments are made to bring the two images into direct alignment, so as to appear as a single straight line. It is found that the human eye can very accurately detect precise alignment of single line images which lie parallel to each other and extend oppositely from the incidence plane. It is found that errors increase when the images are made more complicated by multiplying the number of lines or by using an image configuration other than a straight line. Of greatest importance is the fact that because of certain properties of the human eye much greater accuracy is achieved by this method of end-to-end alignment of images than by bringing line images into coincidence by superimposition of one image upon another. (See D. H. Jacobs, Fundamentals of Optical Engineering (1st ed., McGraw-Hill, 1943), page 86).

Images I and I' are in alignment on a surface whenever it is located in a viewing plane coincident with the point of intersection O of the light paths L and L' as is the surface S seen in FIGURE 2, whereas nonalignment exists in all other viewing planes. When the imaging surface is located in one of these other planes, any of several different adjustments may be made to effect relative line image movement to achieve alignment. Relative movement may be effected between the imaging surface (S') either transverse to the surface as indicated by arrows A, by tilting the surface with respect to the light paths about an axis outside the region between the images, as indicated by arrows B, or by movement of the projectors in the direction of arrows A' so that another surface S" is presented to the convergent light paths, which is the equivalent of relative transverse movement as indicated by arrows A. Alternatively, relative movement of the projectors themselves may be effected to achieve the relative line image movement, either by changing the relative positions of the projectors linearly as indicated by arrows C, or angularly as depicted by arrows D. In the preferred embodiments of this invention relative line image movement is achieved by movement depicted by arrows A, A', B or C, and not as depicted by arrows D. This is because as a matter of precision instrument construction it is simpler and less expensive to provide accurate linear movement of parts than rotational movement. Due to the relatively small convergence angle between the light paths, which is necessary to reduce distortion of the thin line images caused by surface irregularities, a slight angular displacement of one of the light ray paths with respect to the other would result in a large difference in the location of their point of intersection. Thus angular movement of projector elements is not used as a means for achieving relative line image movement.

The operating movement of the projectors with relation to one another or with relation to the imaging surface may be used as a measure of either the distance X from the projectors to the surface S upon which alignment is ultimately achieved, or a distance Z between one surface of image alignment S and a second surface S' where image alignment is secondarily achieved by such relative movement. Hence by establishing image alignment on one surface constituting a reference, then casting the images onto a different surface area of unknown position, which displaces the images relatively, then shifting the line images back into alignment through instrument adjustment, and measuring the amount of adjustment, a measure of distance is obtained.

In the embodiment of FIGURES 3 through 7 an elongated housing 20 of rectangular cross section encloses a dual image projection system and a portion of microscope 22. This housing is detachably mounted for vertical movement on a standard vernier height gauge 26. The housing bottom wall 30 has a central viewing aperture 38 aligned with microscope 22, and opposite side apertures 30b through which light is projected to form line images on a surface, such as S, in the field of view. Light projection passages 46 extend upwardly lengthwise of the housing along the narrow sides 32 thereof to the top 36. Downwardly directed lamps 40 are mounted in the upper ends of these passages. Plugs 38 which carry the lamp contacts 42 and energizing conductors 44 are set in apertures formed in a removable cover 37 held on top of the housing 20 by the microscope tube 68 which projects above the housing in alignment with bore 71. The lower end of tube 68 is threaded down into housing 70 at 69. The individual image projectors further comprise sleeves 48 removably received in the respective passages 46. A line-image-forming reticle 50 is carried in the top of each sleeve and an objective lens 52 at a lower position in the sleeve. The sleeves 48 rest on positioning sleeves 54 received in the lower ends of the passages 46 as shown.

The two projector passages 46 open at their lower ends into the transversely extending chamber 56. Within chamber 56 is contained a novel projector prism assembly specially conceived and constructed for this instrument, but having broader application. This assembly is shown separately in FIGURE 7. The broken lines R and R' represent paths of focused patterns of light rays received from the left- and right-hand projector lens assemblies, respectively. It will be noted that the light path segments directly incident upon surface S converge mutually toward that surface along a plane of incidence which in this case contains the common interface plane between the two prisms in the reflector assemblies 60, 61 and 62, 63. This plane is also a plane of symmetry for the microscope and image projector assembly.

The prisms used in these reflector assemblies act as reflectors and not as refractors, so that no color dispersion problem is introduced into the system. The image pattern received from the left-hand projecting system along the line R strikes the reflecting face 60a of receiving prisms 60 and is reflected transversely across the chamber 56 to the projecting prism 62 which reflects it downwardly toward the surface S as shown. The image received along line R' strikes receiving prism 63 and is reflected transversely across the chamber 56 to the reflecting surface 61a of projecting prism 61, thence downwardly to an imaging surface. The prisms 60 and 61 of the projector prism assembly on the left are cemented together, as are the prisms 62 and 63 on the right.

There are several advantages to this particular novel prism assembly. Firstly, if single canted mirrors were used on each side to project the reticle line images directly from the projector lens systems onto the surface, light ray dispersion and, consequently, some distortion of the images, would occur due to the large angle of incidence on each mirror. In the assembly shown, however, the angles of incidence are relatively small so that light ray dispersion is not a problem and the line images remain better defined. Secondly, if single canted mirrors were used, necessitating large angles of incidence thereon, the margin of error allowable in mounting the mirrors in the instrument would necessarily be small, since a small angular error in mounting would result in a large error in the position of the image as it falls on the imaging surface. By the same token, more elaborate securement of the mirrors would be necessary to avoid possible loosening or angular displacement which would cause similar errors. On the other hand, with the construction as provided by this invention a small angular error in mounting or a small angular displacement of either pair of conjointly mounted prisms would result in a relatively small lateral displacement of the line image as projected onto the imaging surface. Moreover, such angular displacement would shift both line images (i.e. both that initially and that finally projected by the pair) in the same direction on the surface. In other words, the system is self-compensating in this respect. Thirdly, the line images may be projected by this system at smaller angles of incidence on the imaging surface than would be permitted by a canted mirror arrangement.

The microscope used in this instrument may comprise any suitable combination of conventional optical elements for magnifying the imaging surface area and the images as they appear thereon. In the case illustrated the microscope consists of eye piece 66 set in the support 64 slidably received in supporting tube 68 to permit focusing. An objective lens 70 is supported within the lower end of the bore 71 by a threadably-secured bushing 72.

The entire projector and microscope unit 20 may be mounted on any suitable height measuring instrument or tool of sufficient stability and accuracy. In this case a standard vernier height gauge is chosen for illustration, comprising a base 74 upon which is mounted a post 76 having a scale 77 calibrated in appropriate units and carrying the adjustable sliding member 78. The projector and microscope unit 20 is mounted detachably upon sliding member 78 by means of the cross arm 80 attached to the unit 20. The cross arm 80 fits into a socket on the slidable member 78 formed by the cross piece 82 and bracket 83, and is secured by the knurled set screw 84 threaded into the bracket 83. Movement of the slidable member 78 along the post 76 can be controlled for sensitive adjustment by the knurled sensitive adjustment screw 86. This adjustment screw 86 acts through means not shown, such as a pinion engaging a post-mounted rack or through a friction wheel engaging the post directly. It is disengageable for major traverses by member 78 along the post by means of the detents 85 projecting from its opposite sides. The slidable member is provided with a vernier scale 79 cooperating with the calibrated distance scale 77 on the post 76.

Measurement by this instrument is achieved quite simply and accurately. After connecting the illuminator leads 44 to a source of electric power, the line images produced by the dual projection systems are brought into end-to-end alignment on a reference surface S, as viewed through microscope 22, by vertical sliding movement of the unit 20 on the height gauge 26. Final sensitive adjustment is achieved by operation of screw adjustment 86. The reading of associated scales 77 and 79 is recorded for this reference alignment, or scale 77 is zeroed upon this reference surface if the height gauge is adapted for a zeroing adjustment. A body T, the dimensions of which are to be gauged, for example, may then be placed on surface S and the unit 20 adjusted vertically upward until image alignment is again attained on its upper surface S'. The reading of scales 77 and 79 is again taken, and the difference in readings indicates the precise vertical dimension of the body T.

An additional advantage inherent in this instrument is the fact that it does not require repeated refocusing for viewing surface area in planes lying at different distances from the microscope objective. After the microscope ocular 64 is once focused for viewing a surface S coincident with the point of intersection O of the projected light paths, it thereafter remains focused at the proper distance for image alignment. It will also be noted that no physical contact of the instrument with the gauging surfaces of the object being measured is necessary, as is the case with measuring tools presently used for similar purposes.

Other varied applications for this instrument, as well as for the broad principles inherent in it, will readily be recognized by those skilled in the art. For example, this instrument is adapted for measurement of the depth of pits, grooves or recesses in the surfaces of materials whose strength and usability for certain purposes may be critically affected by the presence of such discontinuities.

Each of the respective projecting systems of the instrument produces on the imaging surface a semicircular (or other configuration, depending on projector or microscope aperture form) light pattern 90 traversed by a thin dark line 92 constituting the image of the single reticle line 50. Prior to adjustment these light patterns and line images fall on the surface in transversely offset relationship, appearing as shown in FIGURE 8 when viewed by the naked eye. As seen through the microscope 22 they appear as in FIGURE 9 when unaligned, and as in FIGURE 10 when aligned, the circle 93 representing the field of view of the microscope. The dividing line 91 between the light patterns corresponds to the line of intersection between the imaging surface area and the incidence plane P as shown in FIGURE 1.

In FIGURE 11 is illustrated another embodiment of the invention, an instrument which may be termed an optical caliper. In this device two projector and microscope units such as that just described are mounted on a common base, i.e. at established or determinable spacing, and directed normally on a common axis, with a body to be measured for thickness placed between them. Opposite surface areas of the body then become imaging surfaces for the two units. When line image alignment is achieved with both units simultaneously, the physical distance between the respective viewing planes of image alignment for the two units is a measure of the thickness of the body.

A unique advantage of the device when both units have independent adjustments is that positioning of the body at any particular spacing from either unit is unnecessary, since the units themselves serve as mutual referencing devices. In this particular embodiment a microscope and projection unit 94 indentical to that previously described is mounted on a bracket 96, which in turn is connected to the supporting bar 98, and facing toward the second such unit 95 mounted on a like bracket 97 which slides along the supporting bar 98, and suitable supporting means 100 for the combination. While the microscope of unit 94 is equipped with the same ocular arrangement 94a as that of the unit previously described, the microscope of unit 95 is equipped with an offset or angularly directed ocular 95a to facilitate reading the same from a different direction. This arrangement may be achieved by any suitable or conventional means, such as a small deviation prism (not shown) disposed in the line of sight at the elbowed portion 95b.

The unit 94 and its bracket 96 are preferably mounted fixed upon the supporting bar 98, while the opposing unit 95 is adapted to be moved along the bar 98 by sliding movement of the bracket 97 in a track or groove 99. The sliding unit 95 slides along the bar 98 by manual adjustment. The adjusting screw 101 connected to a pinion (not shown) which releasably engages a rack (not shown) on the underside of the bar 98, is provided for sensitive adjustment. The scale 102 on the upper edge of the supporting bar 98 is calibrated in suitable units and preferably is referenced to the first projecting unit 94 at the left-hand end. That is, the zero reading on the scale 102 is preferably located in the viewing plane of image alignment for the unit 94. An associated vernier scale 103 is provided on the bracket 97.

In one method of measurement with this instrument the object to be measured, such as a cylinder Q for example, is positioned for image alignment on its surface facing the projector unit 94 which surface thereby becomes the referencing surface. Suitable adjustment means may be provided for facilitating this positioning, such as a movable body support (not shown). Preferably, however, a means, such as adjusting screw 98a, is provided for moving the supporting bar 98 itself in the direction of its length with respect to the object being measured. When image alignment is achieved on the referencing side, the projector unit 95 is slid along the supporting bar 98 and sensitive adjustment screw 101 is engaged and operated until image alignment is achieved on the side of the body facing this unit. The thickness of the cylinder Q is then read directly from the vernier scale 103 in cooperation with the calibrated scale 102. No reference reading need be taken with this arrangement. After the line images on both sides of the object are correctly aligned the desired dimension may be read directly. Alternatively, unit 94 is made independently adjustable along bar 98, for example, through use of adjusting screw 101. A separate scale (not shown) is provided for this unit, and the thickness of a body being measured is determined by subtracting the scale reading of one unit from that of the other.

Suitable vertical adjustment means, such as the screw adjustment 104, may be provided for raising and lowering the supporting bar 98 to permit measurement of the lateral dimension at any vertical location within its range.

Advantages of such a caliper over mechanical calipers designed to achieve generally the same purposes include the fact that in this case no physical contact with the measured item is necessary, and still greater accuracy is obtainable with the present system. The principle of an optical caliper is, of course, applicable to internal calipering measurements, as well as the illustrated external calipering type of measurement.

A third embodiment of the invention, which may be called an optical probe for internal measurements, is illustrated in FIGURES 12 to 16. This instrument is adapted to measure minute distances such as surface irregularities or discontinuities within the limited confines of various enclosures or in otherwise relatively inaccessible locations.

In the past certain optical probing instruments have been devised for visual inspection of the inside of tubes, cylinders and the like, but no adequate instrument is known for making accurate measurements in such locations. In this embodiment of the invention the projection system and optical system are mounted within an elongated tubular housing member 106. One end of the member contains the projection system for directing the line images to an external imaging surface. The other end is adapted for viewing the imaging surface area and for effecting operating adjustment of the projection system for relative aligning movement of the line images. The projection and optical systems of this instrument are adapted for construction with relatively small transverse dimensions so that the diameter of the tubular housing member may be of the order of one inch or less.

The projection system includes an illuminator 108, suitable light ray pattern defining lenses 110, and a single line reticle 112, all mounted within the movable tubular supporting member 120, and a unique combination of reflecting elements for projecting two images of the reticle line onto an imaging surface. A first reflecting prism 114 having angularly disposed reflecting surfaces 114a and 114b is positioned in the path of the pattern of light rays traveling from the reticle 112. The reflecting surfaces 114a and 114b of this prism each receive a full image of the reticle line as shown. These images are reflected in laterally opposite directions to a pair of projecting prisms 116 and 118. Each of these projecting prisms is positioned to receive only half of the reticle line image reflected by the first prism 114. They are positioned on vertically opposite sides of a projecting plane J lying perpendicular to the reticle line image and bisecting prism 114 horizontally. Prism 116 lies contiguous to and above projecting plane J, and prism 118 lies contiguous to it and below it. The respective reflecting surfaces of these projecting prisms are positioned to reflect the half image received thereby along converging light paths M and M' contiguous to the projecting plane J, the respective images extending transversely in opposite directions from that plane. The three prisms 114, 116 and 118 are mounted on a bracket arrangement 113 and secured to the movable supporting member 120 for a purpose to be explained hereinafter.

Line image alignment on the imaging surface is achieved in this embodiment by relative movement of different parts of the projection system. The images projected by prisms 116 and 118 are received by a common reflecting prism 122 positioned to deflect them downwardly through the aperture 105 in the tubular housing member 106 to an imaging surface S' external to the instrument. The images are seen in FIGURE 13 as they appear on the imaging surface S' when not in alignment. The deflecting prism 122 is mounted stationary within the instrument in predetermined relation to the aperture 105. The remainder of the projection system, carried by the tubular member 120 and the bracket 113 connected thereto, is movable within the instrument. Relative movement of projector elements 116 and 118 with respect to deflecting element 122 by movement of these members will cause the line images appearing on the reflecting surface 122a of prisms 122 to move laterally as indicated by arrows 122b, due to the convergence of light ray patterns M and M'. This in turn causes relative movement of the reflected line images appearing on the external imaging surface.

The adjusting means for effecting this operating movement of the supporting member 120 and conjointly mounted bracket 113 will now be described. These members are connected to the bulkhead 134 which is adapted to slide along the length of housing member 106 in response to actuating movement of the elongated rod 136 rotationally connected thereto. During its operating rotational movement actuating rod 136 acts against compression spring 135 mounted between the end wall 106b and bulkhead 134. This rod 136 is connected at its opposite end to an adjusting knob 138. This adjusting knob and the cooperating shank portion 140 comprise a conventional threaded micrometer drum assembly adapted for measuring the amount of operating movement necessary to achieve line image alignment. Spaced graduations around the forward edge of the adjusting knob 138 and associated graduations along the length of the shank for indicating the distance moved by the rod 136 in the direction of its length are calibrated to indicate in appropriate units the distance Z between any two imaging surfaces S and S' upon which image alignment is successively achieved.

Another unique aspect of this embodiment is the fact that the same deflecting prism 122 which directs the line images to the imaging surface also directs the line of sight N of the optical system to the imaging surface. The optical system in this embodiment comprises the ocular 124 mounted for focusing adjustment in the tubular extension 126 which projects transversely from the tubular housing 106 at a slightly offset position to avoid the rod 136. A reflecting element 128 is mounted internally of the housing member 106 for directing the line of sight N along the length thereof. Suitable magnifying lenses 130 disposed in the line of sight between the reflecting element 128 and the deflecting prism 122 complete the optical system.

This embodiment of the invention also includes provision to further lengthen the tubular member 106 so that measurements may be made in even more inaccessible locations. Thus in FIGURE 16 is illustrated the addition to the instrument of FIGURE 12 any suitable number of tubular sections 142 interposed in the instrument as shown. Each such section includes an optical train means 144 including additional lenses for lengthening the view of the optical system to correspond with the added length of the instrument. Each section also includes the length of actuating rod 136b suitably mounted therein. Suitable connecting means are provided at the ends of each section 142, as well as at the ends of each section of actutating rod 136b, for securing such sections together in a stable and accurate manner.

Measurements are made with this instrument in much the same way as with those previously described. The tubular housing member is positioned for measurement, such as by insertion into a cylinder in which grooves, scratches or recesses are to be detected and measured. Image alignment is achieved on a referencing surface such as the surface adjacent a scratch or groove, by adjustment of knurled knob 138. The instrument is then moved slightly for projecting line images into the scratch or groove whose depth is to be measured, and line image alignment is again achieved by operating the adjusting knob 138. The difference in readings of the micrometer scales 140a and 138a indicates the distance between the imaging surfaces or the depth of the groove, for example.

While certain preferred embodiments and adaptations of the invention have been chosen for illustration, it will be recognized by those skilled in the art that various other useful applications and possible forms are possible within the scope of the appended claims.

I claim as my invention:

1. Optical measuring apparatus comprising: an optical magnifying system including focusing means and adapted for viewing imaging surfaces spaced different distances from said system; first and second projection means each including reticle means, light producing means and light collimating means for projecting respective reticle line images in illuminated beams; said projection means being positionally coordinated with said magnifying system and operable respectively to project first and second reticle line images along first and second light paths converging mutually toward a first imaging surface viewable through said magnifying system, with said paths lying substantially contiguous to opposite sides of a common plane of incidence and with said reticle line images extending oppositely from said common plane in transverse relation thereto; projection adjusting means coupled with at least one such projection means to move the same from a position of mutual end-to-end alignment of the reticle line images on said first imaging surface to a position of mutual end-to-end alignment thereof on a second imaging surface viewable through said magnifying system; and scale means coupled with the projection adjusting means and calibrated to measure such movement and thereby the distance between the respective imaging surfaces.

2. The apparatus defined in claim 1 wherein said adjusting means includes a common support structure holding said magnifying system and said projection means in fixed relation with one another for conjoint movement relative to said imaging surfaces and means operable to effect relative movement thereof with respect to said imaging surfaces to effect the relative aligning movement of said reticle line images on said surfaces.

3. The apparatus defined in claim 2 wherein each projection means further includes a first and a second reflecting element upon which the reticle line image therein is successively incident, said reflecting elements being mounted with their reflecting surfaces extending transversely to said incidence plane, the first reflecting element of each projection means being fixedly joined to, and on the opposite side of said plane from, the second reflecting element of the other projection means.

4. The apparatus defined in claim 3 wherein said magnifying system comprises a microscope focusable in the plane of alignment of said reticle line images; said support means comprises a common housing containing said microscope and said projection means all having their axes directed parallel to one another and located in said incidence plane with the microscope axis positioned centrally between the axes of said projection means, one end of said housing including means positioning the first reflecting element of each projection means to receive the reticle line image from the collimating means thereof and to direct said image transversely of said axes to the second reflecting element thereof and positioning the second reflecting elements of the respective projecting means to direct the received images to converge toward the imaging surface along said light paths; and wherein said adjusting means includes a base and a housing supporting member mounted on said base and operable to move said housing relative thereto.

5. The apparatus defined in claim 1, wherein said projection means include first and second projector elements, respectively, and a common reflecting element interposed in said paths to receive said reticle line images from said projector elements and direct said images to said surface, said common reflecting element also being positioned in the line of sight of said optical system to direct the view thereof to said imaging surfaces.

6. The apparatus defined in claim 5, including means operable; to move said first and second projector elements conjointly toward and away from said common reflecting element, thereby to effect the relative movement of said line images on said imaging surface.

7. The apparatus defined in claim 6, wherein said apparatus is supported within an elongated tubular member having said third reflecting element positioned adjacent to one end thereof and the adjusting means and the eyepiece of said optical system located adjacent to the other end thereof, said adjusting means including rotatable means adjacent to the second mentioned end having micrometer scale means thereon comprising said calibrated measuring means, said rotatable means being operable to effect the conjoint movement of said projector elements relative to said common reflecting element, thereby to permit measuring in relatively inaccessible locations.

8. The apparatus defined in claim 7, further including extension means additive to said tubular member and adapted to lengthen the same, including optical train means for lengthening the view of said optical system, thereby to extend the view of said apparatus to yet less accessible imaging surfaces.

References Cited

UNITED STATES PATENTS

| | | |
|---|---|---|
| 1,451,302 | 4/1923 | Mihalyi. |
| 2,216,003 | 9/1940 | Eppenstein et al. |
| 2,351,770 | 6/1944 | Koenig _____ 88—14 X |
| 2,376,836 | 5/1945 | Tunnicliffe _____ 88—1 |
| 3,022,578 | 2/1962 | Seibel. |
| 3,139,792 | 7/1964 | Wenthe. |
| 3,178,994 | 4/1965 | Lang _____ 88—14 |

JEWELL H. PEDERSEN, *Primary Examiner.*

T. L. HUDSON, W. L. SKLAR, *Assistant Examiners.*